United States Patent [19]

Lee et al.

[11] Patent Number: 6,096,827

[45] Date of Patent: Aug. 1, 2000

[54] FLUORINE-CONTAINING GRAFT COPOLYMER AND ITS MANUFACTURING METHOD

[75] Inventors: Soo Bok Lee; Dong Kwon Kim; Kwang Won Lee; Kwang Je Kim; In Jun Park, all of Daejeon, Rep. of Korea

[73] Assignee: Korea Research Institute of Chemica Technology, Rep. of Korea

[21] Appl. No.: 09/155,905

[22] PCT Filed: Jul. 26, 1996

[86] PCT No.: PCT/KR96/00119

§ 371 Date: Oct. 8, 1998

§ 102(e) Date: Oct. 8, 1998

[87] PCT Pub. No.: WO97/38032

PCT Pub. Date: Oct. 16, 1997

[30] Foreign Application Priority Data

Apr. 10, 1996 [KR] Rep. of Korea ...................... 96-10736

[51] Int. Cl.[7] ................................ C08F 29/00; C08F 2/38
[52] U.S. Cl. ................................ 525/72; 525/67; 525/87; 526/279
[58] Field of Search ................................ 525/72, 67, 87; 526/279

[56] References Cited

U.S. PATENT DOCUMENTS 5,594,067 1/1997 Doi et al. ................................ 525/477

OTHER PUBLICATIONS

Japanese Patent Unexamined Publication No. Sho 54–137489, dated Oct. 25, 1979 (English Translation of Claims).

Japanese Patent Unexamined Publication No. Sho 56–163183, dated Dec. 15, 1981 (English Translation of Claims).

"Synthesis and Application of Fluorine Containing Graftcopolymers", Yuya Yamashita et al., Polymer Bulletin 5, 335–340 (1981).

*Primary Examiner*—P. Hampton-Hightower
*Attorney, Agent, or Firm*—Finnegan, Henderson, Farabow, Garrett & Dunner, L.L.P.

[57] ABSTRACT

The present invention relates to a fluorine-containing graft copolymer and its manufacturing method. In particular, the fluorine-containing graft copolymer synthesized by copolymerization of copolymerizable perfluoroalkyl compound as a main chain and macromonomer having copolymerizable vinyl group at one end as branched chains, respectively. Thus the graft copolymer has the remarkable affinity to the substrates designed for the surface modification and superior performance than random copolymers, when it is employed as various types of surface modifiers of fluorine-containing compounds (e.g., water and oil repellent, soil release agents, mold-releasing agents, etc.).

4 Claims, No Drawings

FLUORINE-CONTAINING GRAFT COPOLYMER AND ITS MANUFACTURING METHOD

FIELD OF THE INVENTION

The present invention relates to a fluorine-containing graft copolymer and its manufacturing method. The fluorine-containing graft copolymer is synthesized by copolymerization of a monomer with perfluoroalkyl group and a macromonomer that has copolymerizable vinyl group at one end of a molecule. Thus, the graft copolymer consists of the perfluoroalkyl lo compound and macromonomer segment as a backbone and branched chains, respectively. Since the graft copolymer has miscibility with the substrates for surface modification, various applications are expected in the field of water/oil repellent, soil release agents, mold release agents, etc.

BACKGROUND OF THE INVENTION

Fluorine-containing copolymers, obtained by copolymerization of the perfluoroalkyl compound with other copolymerizable vinyl monomers, have been known to be very useful as low-energy surface modifiers in various forms hitherto. But it is known that perfluoroalkyl compounds show poor adhesiveness due to the extremely low-energy surface characteristics with various substrates like fiber, plastic, rubber, ceramic and metal etc.

Therefore to improve the adhesiveness, comonomers have been used which have relatively high surface energy with the affinity or may be adhered by reaction to the substrates.

However, in case of random copolymers, the perfluoroalkyl compound and comonomers are resided in the backbone concurrently, thus show the mixed surface properties of the two monomers; Namely, the low-energy modification characteristics from the perfluoroalkyl compound is damaged by high surface energy comonomer, and the surface modification effect of the copolymer is reduced. Therefore, when the random copolymer is used tor low-energy, surface modification of substrates, excessive amounts of high-priced perfluoroalkyl compound should be used in order to reduce the surface energy of the substrate to the desired level. And manufacturing costs of the random copolymer are deemed to be high compared with the performances.

Recently, a graft type copolymer was synthesized using oligomer of perfluoroalkyl compound as branched chains and other comonomers as a backbone by solution or emulsion polymerization. And the graft copolymers have been used as a fluorine-containing surface modifier (Japanese Patent unexamined publication Soh 54-137489 and Soh 56-163183).

However, in case of forementioned method, an high surface energy group from the initiator is attached in the fluorinated oligomer which has so small molecular weight (degree of polymerization: about 10), and the low-energy surface properties of perfluoroalkyl group is hindered by initiator group. Hence the surface modification performance is reduced.

Furthermore, since the homopolymer of perfluoroalkyl compound as a branched chain has lower degree of polymerization, its mechanical properties may be suspected.

The inventor et al. has made their intensive studies for several years on new fluorine-containing surface modifier that has improved surface properties, surface modification effect and compatibility with substrates. As the results, the fluorine-containing graft copolymer is synthesized the emulsion copolymerization of a perfluoroalkyl compound and a macromonomer that has only high molecular weight perfluorinated segments in the backbone and shows an affinity of a branched chain to the substrates, respectively.

SUMMARY OF THE INVENTION

The object of present invention is to provide the fluorine-containing graft copolymer and its manufacturing method having better low-energy surface modification properties and superior compatibility with the substrates compared with random copolymers or graft copolymers with a oligomer of perfluoroalkyl compound as mentioned above which have been used largely as a surface modifier at present.

DETAILED DESCRIPTION OF THE INVENTION

The present invention relates to a graft copolymer for a surface modifier comprising the perfluoroalkyl compound selected from the following chemical formulas (1), (2), (3) and (4) as a backbone with macromonomers from the monomers of unsaturated double bond as branched chains.

$$XC_nF_{2n}CH_2OCOCR^1=CH_2 \quad (1)$$

$$XC_nF_{2n}SO_2NR^2(CH_2)_mOCOCR^1=CH_2 \quad (2)$$

$$XC_nF_{2n}CH_2CH(OH)(CH_2)_mOCOCR^1=CH_2 \quad (3)$$

$$XC_nF_{2n}(CH_2)_mOCOCR^1=CH_2 \quad (4)$$

Wherein,
$R^1$ is hydrogen, or methyl group,
$R^2$ is methyl, ethyl, or propyl group,
X is hydrogen, fluorine, or chlorine,
m is an integer of 2 to 6 and
n is an integer of 3 to 21

In the fluorine-containing graft copolymer of the present invention, since the branched chain is consisted of the macromonomers having the same chemical structure as substrates, it is miscible with substrates. Further, the backbone of the graft copolymer is composed of only perfluoroalkyl compound. Hence, the graft copolymer shows a remarkable low-energy Surface modification effect due to the superior surface migration activity of the fluorinated segment and air-side orientation of perfluoroalkyl group.

As far as the graft copolymer of present invention is concerned, the macromonomers which composed of branched chains are made by anionic or radical polymerization using the comonomers having unsaturated double bonds.

The available comonomers in the present invention includes one or more than selected from following vinyl monomers e.g., (meth)acrylic acid, methyl (meth)acrylate, ethyl (meth)acrylate, butyl (meth)acrylate, hexyl (meth)acrylate, dodecyl (meth)acrylate, stearyl (meth)acrylate, benzyl (meth)acrylate, cyclohexyl (meth)acrylate, acrylonitrile, acrylamide, vinyl acetate and styrene; and monomers containing the crosslinkable group e.g., N-methylol (meth) acrylamide, N-methylol acrylamide butylether, N-butoxy (meth)acrylamide, 2-hydroxy (meth) acrylate, and 2-hydroxypropyl (meth)acrylate.

In order to prepare the fluorine-containing graft copolymer of the present invention, a macromonomer is synthesized first by polymerizing the above mentioned monomers or comonomers comonomers for branched chains and then, copolymerized with perfluoroalkyl compound, expressed as chemical formulas (1) to (4), by the solution or emulsion polymerization.

For the emulsion copolymerization, some emulsifying solvent may be added so as to improve its emulsion property according to the types of comonomers. The solvent for emulsion may be typically selected from one or more following solvents, for examples, ketones such as acetone, methylethylketone, etc.; hydrocarbon halides such as carbon tetrachloride, chloroform, benzotrifluoride, 1,1,2-trichlorotrifluoroethane, etc.; acetates such as ethyl acetate, butyl acetate etc.; aromatic hydrocarbons such as benzene, toluene, xylene, etc.; tetrahydrofuran; and dimethylformaldehyde. It is not necessary to restrict the solid content of polymer in emulsion polymerization, the concentration in 15~30% by weight is preferable, in general. Emulsion and solution polymerizations are carried out either at normal or at elevated pressure.

The graft copolymer that synthesized by forementioned method consist of the perfluoroalkyl compound as a backbone and macromonomer from monomers or comonomers as branched chains, and their weight ratio has a range of 5/95 to 95/5. Thus, its compatibility with substrates for the surface modification proves to be quite excellent with the remarkable low-energy surface modifiction effect.

The synthesized graft copolymer may be used directly in the form of solution and emulsion or as an additive after precipitation for a surface modifier such as water and oil repellent, etc.

The following examples illustrate the invention, but the claims are not restricted to these examples. The contact angles described in the following are advanced contact angle.

EXAMPLE 1

A mixture of methyl methacrylate(hereinafter referred to as "MMA"; 300 g, 3 mol), tetrahydrofuran(hereinafter referred to as "THF"; 300 g), 2,2'-azobisisobutyronitrile (hereinafter referred to as "AIBN"; 0.492 g, 0.003 mol) and thioglycol (4.68 g, 0.06 mol) was charged to 1 l glass autoclave, equipped with temperature controller and agitation devices, degassed with nitrogen for 30 minutes with agitation. The reaction was initiated by increasing the temperature of the reactant to 60° C. After about 6 h, hydroxy-terminated-poly(metyl methacrylate)(hereinafter referred to as "HTPMMA") having hydroxy group at one end of the molecule was obtained by precipitation of the reactant into n-hexane when the conversion became 40–50% (based on initially charged MMA) analyzed by gas chromatography; yield was about 40%.

The number molecular weight of HTPMMA was 9.000 (degree of polymerization: 90) measured by gel permeate chromatography with standard poly(methyl methacrylate) (hereinafter referred to as "PMMA") after reprecipitation and drying.

A mixture of HTPMMA (50 g, 5.56 mmol), so formed, and THF (100 g) was charged to a reactor and dissolved completely. Then, acryloyl chloride(0.518 g, 5.72 mmol) was slowly added to the solution at room temperature for about 30 minutes and stirred for about 24 hrs for acylation.

Triethyl amine(0.578 g, 5.72 mmol) was added to the reaction solution for neutralization of HCl generated, and filtrated HCl-triethylamine salt using cellite. The filtrate was added to hexane to precipitate PMMA macromonomer and dried under vacuum at room temperature. The yield of PMMA macromonomer was about 90% based on HTPMMA.

The ratio of methyl protons of the MMA to protons from the introduced double bond of the PMMA macromonomer, so formed, was calculated by analyzing with nuclear magnetic resonance (NMR) using $CDCl_3$.

The calculation was done by obtaining the ratio of the methyl protons of MMA (at about 3.7 ppm) and introduced double bond (3 complex protons at about 5.8 to 6.4 ppm).

A mixture of PMMA macromonomer (70 g, molecular weight: 9,000), so formed, perfluoroalkylethyl methacrylate $[F(CF_2)_6CH_2CH_2OCOC(CH_3)=CH_2$; hereinafter referred to as "FMA1"; 30 g], toluene (30 g), water (400 g) and polyoxyethylenenonylphenylether (hereinafter referred to as "NP-50"; 10 g) was charged to a reactor, and white stable emulsion was obtained by stirring for about 5 minutes using a two-blade emulsifying device.

An initiator, 2,2'-azobisiso(2-amidinopropane) 2HCl (0.09 g, 0.3% by weight based on FMA1), was added, and degassing of the emulsion was done using nitrogen for 20 minutes. The copolymerization was initiated by increasing the temperature of the emulsion to 70° C. After about 6 hrs reaction, the conversions of FMA1 and PMMA macromonomer were about 90% and 70 to 80%, respectively.

The reaction mixture was precipitated to excess methanol, and washed with hot methanol for about 48 hrs using Soxhlet extractor. The yield of graft copolymer was about 70%.

The synthesized graft copolymer was dissolved in a mixed solution of $CDCl_3$ and $ClCF_2CCl_2F$ (hereinafter referred to as "R-113") (=1/3, in the weight). The NMR analysis showed that the peak corresponding to methylene protons from FMA1 and methyl protons were observed at about 4.3 ppm and 3.7 ppm, respectively. From this results, the calculated weight ratio between FMA1 and MMA was 43/57.

Test solution for solvent die casting was made by dissolving test polymer (FMA1 segment content in graft copolymer/PMMA substrate=0.001, 0.01, 0.1, 1% by weight) to the mixed solution of chloroform/R-113 (=1/3 by weight ratio, test polymer/solvent=1.5% by weight). After forming the film of the thickness about 10 μm by a solvent casting method, the advanced contact angles were measured using water and $CH_2I_2$.

The results are shown in the following table 1.

COMPARATIVE EXAMPLE

For the comparison with the EXAMPLE 1, random copolymer was synthesized by solution polymerization.

A mixture of MMA (50 g), benzotrifluoride (400 g), AIBN (0.082 g) was charged to 1 l glass autoclave equipped with temperature controller and agitator, and degassed with nitrogen for 30 minutes. The copolymerization was initiated by increasing the temperature of reaction mixture to 70° C. After 24 hrs reaction, the reaction mixture was dryed after precipitation and washing with methanol. The compositions of the random copolymer was measured by NMR analysis in the same method as did in graft copolymer of EXAMPLE 1, and the results was 52/48 (FMA1/MMA in weight). Further, after forming the film of the random copolymer as the same method as did EXAMPLE 1, advanced contact angles were measured using water and $CH_2I_2$, and the results are shown in the table 1.

TABLE 1

| | (Unit: degree) | | | |
|---|---|---|---|---|
| Conc. of FMA1 in PMMA | EXAMPLE 1 | | COMPARATIVE EXAMPLE | |
| (weight, %) | Water | $CH_2I_2$ | Water | $CH_2I_2$ |
| 0.0001 | 82.9 | 43.0 | 79.4 | 40.5 |
| 0.001 | 82.7 | 43.4 | 81.3 | 42.3 |
| 0.01 | 104.6 | 70.6 | 89.1 | 60.1 |
| 0.1 | 113.0 | 88.0 | 101.5 | 80.1 |
| 1 | 115.9 | 97.5 | 105.0 | 83.9 |

From the comparison of EXAMPLE 1 with COMPARATIVE EXAMPLE of the present invention, it can be known that advanced angle which is the parameter of water/oil repellency is significantly higher in EXAMPLE 1 than COMPARATIVE EXAMPLE although same amount of perfluoroalkyl compound are used. Therefore, it is well known that the graft copolymer of the present invention proves to be remarkably superior than random copolymers in surface modification effect.

EXAMPLES 2 TO 4

PMMA macromonomer was manufactured in the same manner as did in EXAMPLE 1; but for the manufacture of PMMA macromonomer having a molecular weight of 3,000, thioglycol (23.4 g, 0.1 mole based on MMA) was added for the synthesis of HTPMMA. For acylation and neutralization, acryloyl chloride (1.55 h, 1.03 mole based on HTPMMA), triethylamine (1.73 g, 1.03 mole based on HTPMMA) were added.

Further, the graft copolymer was manufactured by emulsion polymerization of both PMMA macromonomer and perfluoroalkyl compound in the ratio defined in the following table 2.

TABLE 2

| EXAMPLES | 2 | 3 | 4 |
|---|---|---|---|
| Number average molecular weight of PMMA macromonomer | 9,000 | 9,000 | 3,000 |
| Type of perfluoroalkyl compound | FMA2 | FMA3 | FMA4 |
| Inlet weight raito (perfluoroalkyl compound/PMMA macromonomer) | 70/30 | 50/50 | 30/70 |
| Weight ratio in graft copolymer (perfluoroalkyl compound/macromonomer) | 90/10 | 73/27 | 36/64 |

FMA2: $C_8F_{17}SO_2NC_2H_5(CH_2)_2OCOCH = CH_2$
FMA3: $C_8F_{17}CH_2CH(OH)(CH_2)_2OCOCH = CH_2$
FMA4: $C_nF_{2n+1}(CH_2)_2OCOCH = CH_2 (n = 6~12)$

EXAMPLE 5

PMMA macromonomer (molecular weight: 9.000, 70 g, 7.78 mmol) so formed from said EXAMPLE 1 and FMA 1 (30 g), was added to benzotrifluoride (400 g) and dissolved completely. To the mixture, AIBN (0.15 g, 0.5% by weight based on FMA1) was added and degassed with nitrogen flow for 30 minutes. Then, the reaction solution was stirred and reaction was initiated by increasing the temperature to 70° C. After about 5 day, the conversion was about 90%.

The graft copolymer, so synthesized, was analyzed with NMR as the same method as EXAMPLE 1 and as a results, it was noted that the weight ratio of FMA1/MMA was about 36/64. As reaction solvents, a mixture THL/R-113 or chloroform/R-113 was employed in stead of benzotrifluoride but similar results was obtained.

As described in table 1, the fluorine-containing surface modifier with the type of the graft copolymer manufactured by the present invention has a remarkable affinity to substrate, which is desirable properties of the two phase graft copolymer, as well as having excellent water/oil repellency, when compared with conventional random copolymers (COMPARATIVE EXAMPLE).

Therefore, the graft copolymer manufactured based on the present invention is in particular useful in the field of low-energy surface modifiers including water and oil repellents, soil release agents, anti-contaminant resin additives.

What is claimed is:

1. A graft copolymer for surface modifiers consisting essentially of a perfluoroalkyl compound selected from the following chemical formulas (1), (2), (3) and (4) as a main chain, and a macromonomer copolymerized with comonomers having unsaturated double bonds as branched chains $$XC_nF_{2n}CH_2OCOCR^1=CH_2 \quad (1)$$

$$XC_nF_{2n}SO_2 NR^2(CH_2)_mOCOCR^1=CH_2 \quad (2)$$

$$XC_nF_{2n}CH_2 CH(OH)(CH_2)_mOCOCR^1=CH_2 \quad (3)$$

$$XC_nF_{2n}(CH_2)_mOCOCR^1=CH_2 \quad (4)$$

Wherein,
$R^1$ is a hydrogen, or a methyl group,
$R^2$ is a methyl, an ethyl, or a propyl group,
X is a hydrogen, a fluorine or a chlorine,
m is an integer ranging from 2 to 6 and,
n is an integer ranging from 3 to 21.

2. The graft copolymer according to the claim 1, wherein said comonomer is one or more selected from the group consisting of (meth)acrylic acid, methyl (meth)acrylate, ethyl (meth)acrylate, butyl (meth)acryalte, hexyl (meth)acrylate, dodecyl (meth)acryalte, stearyl (meth)acryalte, benzyl (meth)acrylate, cyclohexyl (meth)acrylate, acrylonitrile, acrylamide, vinyl acetate, styrene, N-methylol (meth)acrylamide, N-methlolacrylamidebutylether, N-butoxy (meth)acrylamide, 2-hydroxy (meth)acrylate, and 2-hydroxypropyl (meth)acrylate.

3. The graft copolymer according to claim 1, wherein the weight ratio of the main chain perfluoroalkyl compound to the branched chain macromonomer ranges from 5/95 to 95/5.

4. A process for manufacturing a graft copolymer with macromonomer prepared by anionic or radical polymerization of comonomers having unsaturated double bond and a perfluoralkyl compound selected from the group consisting of the following chemical formulas (1), (2), (3) and (4) by emulsion copolymerization in the presence of emulsifying solvents $$XC_nF_{2n}CH_2OCOCR^1=CH_2 \quad (1)$$

$$XC_nF_{2n}SO_2NR^2(CH_2)_mOCOCR^1=CH_2 \quad (2)$$

$$XC_nF_{2n}CH_2CH(OH)(CH_2)_mOCOC^1=CH_2 \quad (3)$$

$$XC_nF_{2n}(CH_2)_mOCOCR^1=CH_2 \quad (4)$$

Wherein,
$R^1$ is a hydrogen, or a methyl group,
$R^2$ is a methyl, an ethyl, or a propyl group,
X is a hydrogen, a fluorine, or a chlorine,
m is an integer ranging from 2 to 6 and,
n is an integer ranging from 3 to 21.

* * * * *